United States Patent
Park (10) Patent No.: US 7,821,495 B2
(45) Date of Patent: Oct. 26, 2010

(54) APPARATUS AND METHOD FOR CONTROLLING VIDEO DISPLAY DEVICE, VIDEO DISPLAY DEVICE AND MULTIVISION SYSTEM

(75) Inventor: Su Won Park, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 1038 days.

(21) Appl. No.: 11/350,042

(22) Filed: Feb. 9, 2006

(65) Prior Publication Data
US 2007/0057914 A1 Mar. 15, 2007

(30) Foreign Application Priority Data
Sep. 9, 2005 (KR) ............... 10-2005-0084170

(51) Int. Cl.
*G09G 5/00* (2006.01)
(52) U.S. Cl. ............. 345/158; 345/1.1; 340/825.69
(58) Field of Classification Search .......... 345/1.1, 345/158; 340/825.69
See application file for complete search history.

(56) References Cited

U.S. PATENT DOCUMENTS

| | | | |
|---|---|---|---|
| 5,459,477 A | | 10/1995 | Fukuda et al. |
| 5,654,813 A | * | 8/1997 | Whitworth ............ 398/111 |
| 5,701,828 A | * | 12/1997 | Benore et al. .......... 109/56 |
| 6,292,230 B1 | * | 9/2001 | Shui et al. ............ 348/705 |
| 6,501,441 B1 | * | 12/2002 | Ludtke et al. ........ 345/1.1 |
| 7,112,894 B2 | * | 9/2006 | Mc Cullough et al. ... 307/10.1 |
| 2001/0010503 A1 | * | 8/2001 | Darbee et al. ........ 341/176 |
| 2001/0017615 A1 | * | 8/2001 | Lin et al. ............ 345/173 |
| 2003/0169372 A1 | * | 9/2003 | Huang et al. .......... 348/569 |
| 2004/0054826 A1 | * | 3/2004 | Kavanagh ............. 710/62 |
| 2004/0109084 A1 | * | 6/2004 | Koh .................. 348/383 |
| 2005/0017949 A1 | * | 1/2005 | Dunn et al. .......... 345/158 |
| 2005/0114901 A1 | * | 5/2005 | Yui et al. ............ 725/100 |
| 2006/0103545 A1 | * | 5/2006 | Tsou ................. 340/825.69 |
| 2006/0152431 A1 | * | 7/2006 | Song ................. 345/1.1 |
| 2006/0164442 A1 | * | 7/2006 | Furuhata et al. ...... 345/690 |

FOREIGN PATENT DOCUMENTS

EP 0 896 318 A2 2/1999

* cited by examiner

*Primary Examiner*—Bipin Shalwala
*Assistant Examiner*—Afroza Y Chowdhury
(74) *Attorney, Agent, or Firm*—Birch, Stewart, Kolasch & Birch, LLP (57) ABSTRACT

The present invention relates to a method and an apparatus for selectively controlling one or more display devices among a plurality of video display devices constituting a multivision by using a remote controller; a video display device; and a multivision system. The method for controlling the video display device in accordance with a present invention includes the steps of: displaying a predetermined access code when control data for canceling an OSD locking function is received from the outside; receiving control data including an access code from the outside; and entering a control mode using an OSD menu if the access code contained in the received control data is equal to the predetermined access code.

17 Claims, 11 Drawing Sheets

APPARATUS AND METHOD FOR CONTROLLING VIDEO DISPLAY DEVICE, VIDEO DISPLAY DEVICE AND MULTIVISION SYSTEM

FIELD OF THE INVENTION

The present invention relates to a video display device for use in a multivision, and more particularly to a method and an apparatus for controlling each of a plurality of video display devices constituting a multivision; a video display device; and a multivision system.

BACKGROUND OF THE INVENTION

Recently, MPEG video compression standards have been widely applied to every field of technology such as a computer, a broadcasting, home electronics and communications. Accordingly, various kinds of video and audio services and a great variety of digital devices for receiving the services have been developed.

Particularly, a digital television plays an important role in delivering information easily and efficiently in daily life. A user can appreciate various broadcastings of a high-definition image and a high-quality sound at home with no difficulty by receiving digital video/audio data compressed through the use of the MPEG technology.

As a digital television has gotten larger and larger in size, a digital television for use in an advertisement or propaganda has been installed in public places. However, there are limitations on a screen size of the digital television, so it's not sufficient to use the digital television as an outdoor video display device.

Conventionally, there has been proposed a multivision forming a large screen by using a plurality of digital televisions.

The multivision system includes a plurality of video display devices and a controller for distributing image signals to the plurality of video display devices and controlling the plurality of video display devices.

The controller may be connected with the plurality of video display devices through a RS-232C cable. If the controller sends a control command to each of the plurality of video display devices in order to adjust a brightness, a contrast, a phase, a horizontal position, a vertical position and a color temperature thereof, the video display device receiving the control command adjusts a brightness, a contrast, a phase, a horizontal position, a vertical position and a color temperature thereof according to the control command.

Conventionally, although screens of the plurality of video display devices can be adjusted through the use of the controller as mentioned above, it is impossible to adjust the screens by using a remote controller.

In detail, since a general remote controller transmits control data consisting of custom data for identifying a manufacturer and user data generated according to a user's input, a user cannot adjust each screen of the plurality of video display devices located adjacently by using the remote controller.

Accordingly, a user experienced in using the remote controller has a difficulty in adjusting the screens of the plurality of video display devices by using the controller as mentioned above.

Further, when the controller is located away from the plurality of video display devices, the user cannot adjust the screen of each video display device while watching a display state of the video display device directly.

Therefore, it is strongly required to develop a technology capable of controlling each video display device of a multivision by using a remote controller while watching a display state of the video display device directly.

SUMMARY OF THE INVENTION

Accordingly, the present invention has been made to solve the above-mentioned problems occurring in the prior art, and an object of the present invention is to provide a method and an apparatus for selectively controlling one or more display devices among a plurality of video display devices constituting a multivision; a video display device; and a multivision system.

Further, it is another object of the present invention to provide a remote controller for setting an access code for each of a plurality of video display devices forming a multivision and a method thereof.

In accordance with one aspect of the present invention, there is provided a video display device including: a storage unit for storing an access code; a reception unit for receiving control data from the outside; a code recognition unit for checking, when control data including an access code are received by the reception unit, whether the access code contained in the control data is equal to the access code stored in the storage unit; and a control unit for controlling the video display device to enter a control mode using an OSD (on screen display) menu if the two access codes are the same.

In accordance with another aspect of the present invention, a remote controller for controlling a video display device among a plurality of video display devices constituting a multivision, including: a keypad where a multiplicity of keys are arranged; a memory for storing an access code of the video display device; a code generator for generating control data including the access code according to a user's input through the keypad and a code transmitter for transmitting the control data to the video display device; and a controller for controlling the code generator and the code transmitter to generate and transmit the control data which instructs the video display device to enter a control mode using an OSD menu according to a user's input through the keypad.

In accordance with still another aspect of the present invention, a method for controlling a video display device, including the steps of: displaying a predetermined access code when control data for canceling an OSD locking function is received from the outside; receiving control data including an access code from the outside; and entering a control mode using an OSD menu if the access code contained in the received control data is equal to the predetermined access code.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
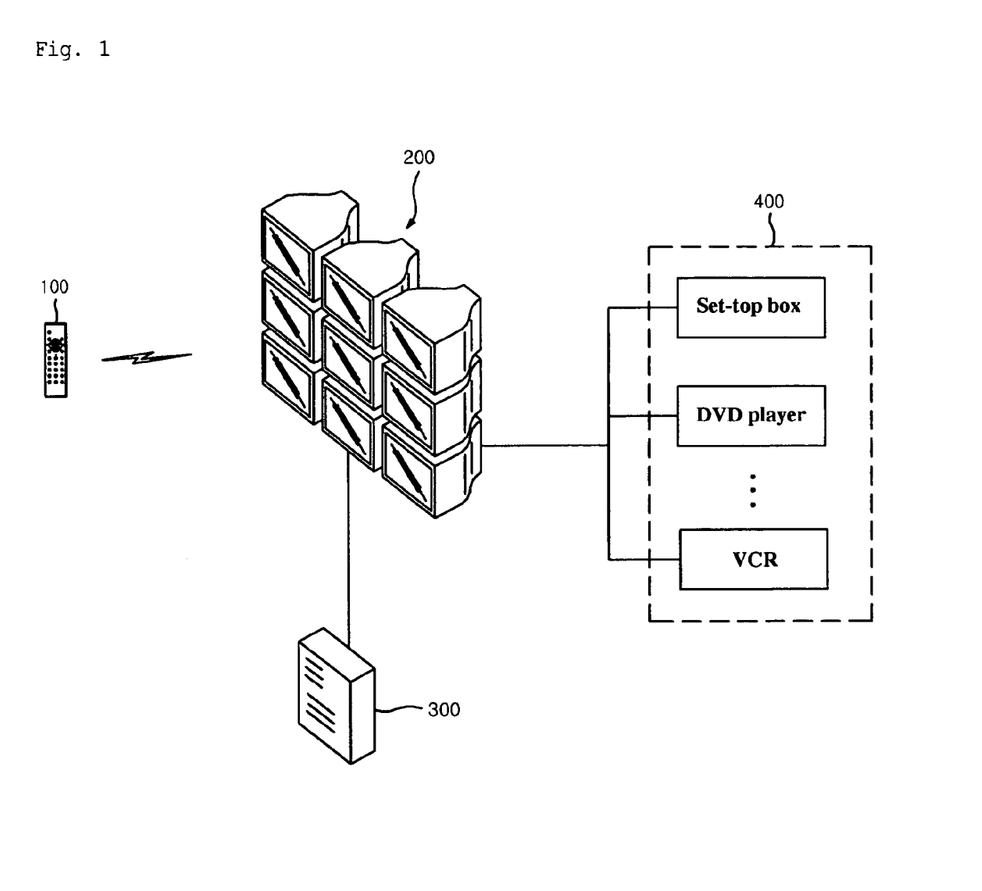
FIG. 1 is a schematic block diagram showing an OSD control system of a multivision using an access code in accordance with an embodiment of the present invention.

Referring to FIG. 1, a multivision 200 can be configured by stacking a plurality of video display devices 200a to 200i in a form of 3×3 array and outputting a video signal divided by 3×3 array into each of the plurality of video display devices 200a to 200i.

The plurality of video display devices 200a to 200i set or cancel an OSD locking function when first control data for setting or canceling the OSD locking function are inputted thereto through a remote controller 100. If the OSD locking function is cancelled, each of the plurality of video display devices 200a to 200i displays one's own access code assigned thereto and the access codes are different from each other.

In case that the OSD locking function is cancelled, if a video display device among the plurality of video display devices 200a to 200i receives second control data including the access code assigned thereto from the remote controller 100, the video display device performs a function according to third control data including command data, which are also received from the remote controller 100.

The first control data are control data for setting or canceling the OSD locking function; the second control data, fourth control data and fifth control data are control data for accessing a video display device; and the third control data are control data for controlling the video display device and the third control data have a format of general control data.

Figure 9:
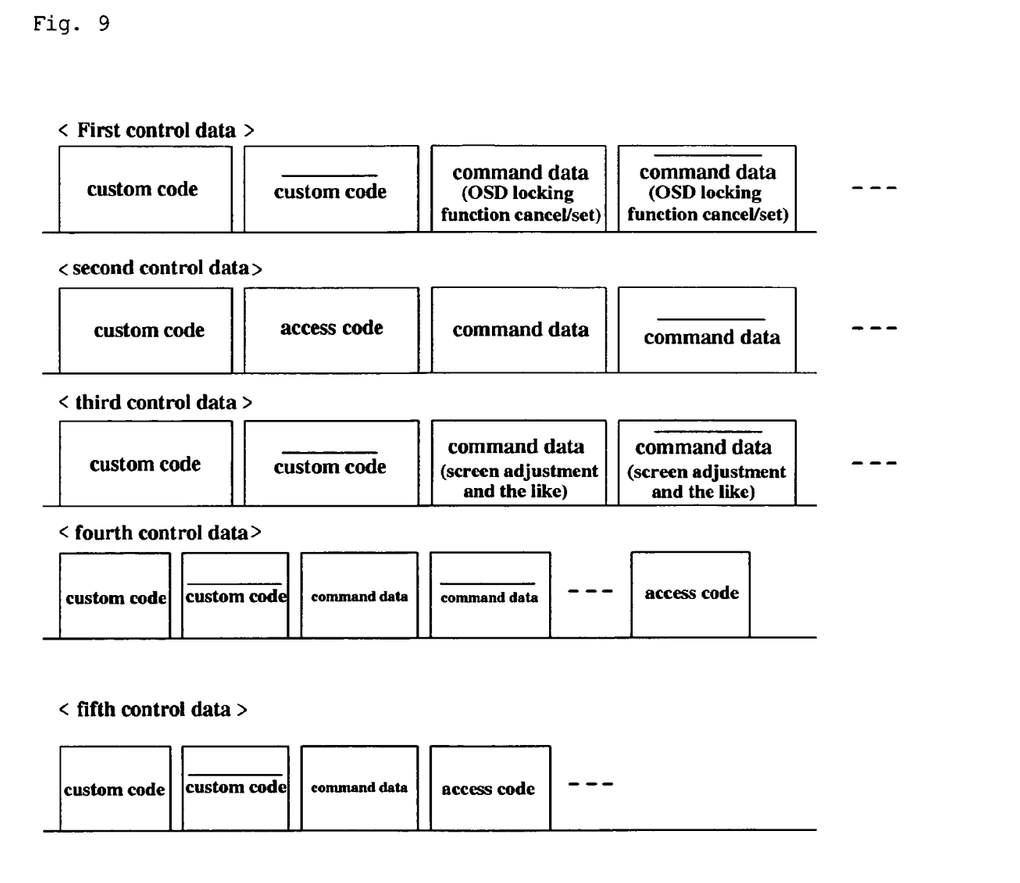
FIG. 9 depicts code formats of control data in accordance with an embodiment of the present invention.

In the following, there will be described briefly formats of the first to fifth data with reference to FIG. 9.

The first control data include a custom code, a reverse custom code, command data and reverse command data. The command data have a command for setting or canceling the OSD locking function.

The second control data include a custom code, an access code, command data and reverse command data. The access code is one's own code assigned to each video display device and the custom code is a fixed code for identifying a manufacturer of a video display device. Accordingly, although there isn't the reverse custom code for preventing an error, there is little error. Therefore, it is preferred to make a code format by inserting the access code in a position of the reverse custom code. Though an example where the second control data include the access code in lieu of the reverse custom code has been described for illustrative purposes, those skilled in the art will appreciate that the fourth control data can be formed by additionally inserting the access code at the rear thereof and the fifth control data can be configured by inserting the access code in a position of the reverse command data. However, only the second control data will be used as control data including an access code hereinafter.

The third control data include a custom code, a reverse custom code, command data and reverse command data and the command data includes a command for controlling a screen of a video display device.

Although only the first to fifth control data have been described for illustrative purposes, those skilled in the art will appreciate that the remote controller 100 can generate various control data based on the format of the third control data and then transmit them to the plurality of video display devices 200a to 200i.

An operator server 300 is connected to a communication port of the plurality of video display devices 200a to 200i and the operator server 300 changes and sets an access code of each video display device in response to a request of an operator.

An external device 400, e.g., a set-top box, a DVD player, a VCR and the like, transmits various types of video signals to the plurality of video display devices 200a to 200i.

The remote controller 100 sends the first control data for canceling the OSD locking function in response to a request of a user; the second data including an access code of a video display device; and the third control data for controlling the video display device.

Figure 2:
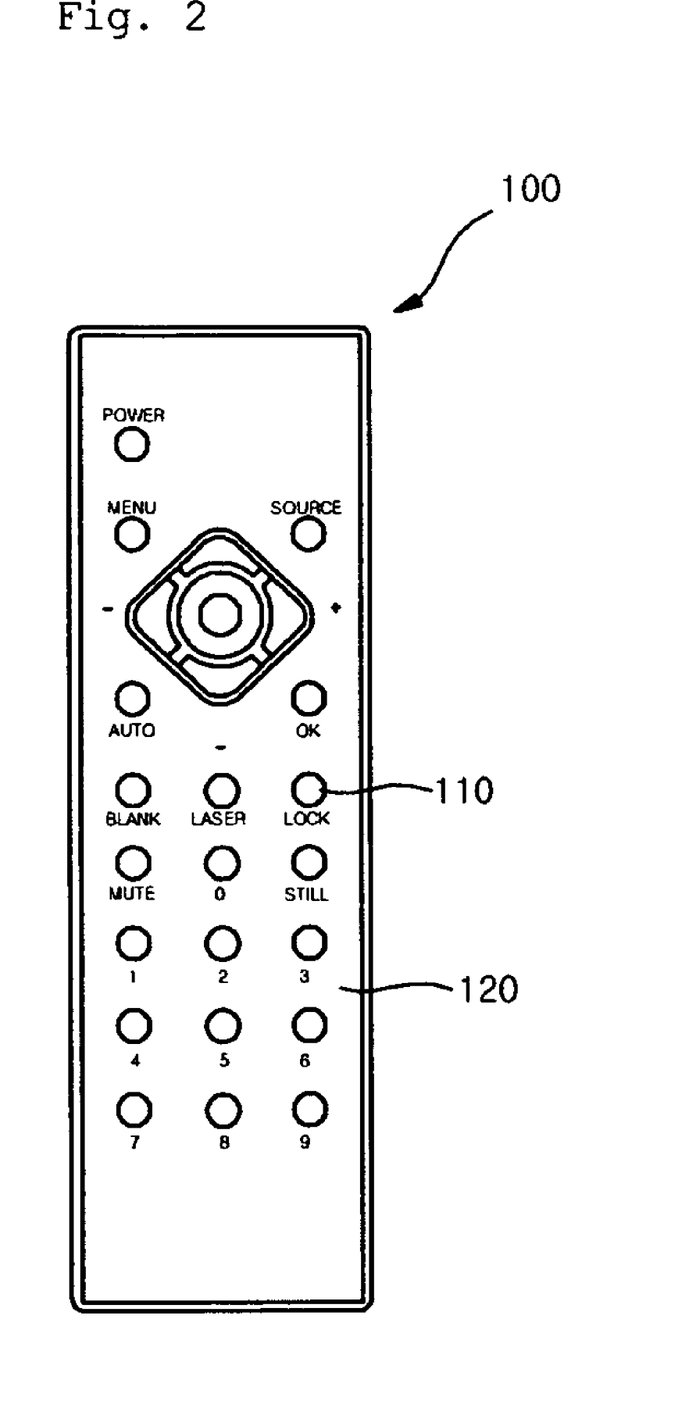
FIG. 2 shows an external shape of a remote controller having a function for setting an access code in accordance with an embodiment of the present invention.

Disposed on the remote controller 100 is a lock key as shown in FIG. 2, and the lock key may cancel or set the OSD lock function. If a user presses the lock key 110 located on the remote controller 100 in order to cancel the OSD locking function of the plurality of video display devices 200a to 200i, the remote controller 100 transmits the first control data for canceling the OSD locking function to the plurality of video display devices 200a to 200i. Each of the plurality of video display devices 200a to 200i receives the first control data and then cancels the OSD locking function and displays an access code assigned to oneself.

If the user presses the lock key 110 of the remote controller 100 again in case that the OSD locking function is cancelled, the remote controller 100 transmits control data for setting the OSD locking function to the plurality of video display devices 200a to 200i. Each of the plurality of video display devices 200a to 200i receives the control data and then sets the OSD locking function and displays an image received from the external device 400 on a screen.

If the user presses an access code assigned to a video display device among the plurality of video display devices 200a to 200i in case that the OSD locking function is cancelled, the remote controller 100 transmits the second control data including the access code to the plurality of video display devices 200a to 200i. Then, only the video display device having the access code enters into an access mode and is ready to perform an action based on the third control data received from the remote controller 100.

Figure 3:
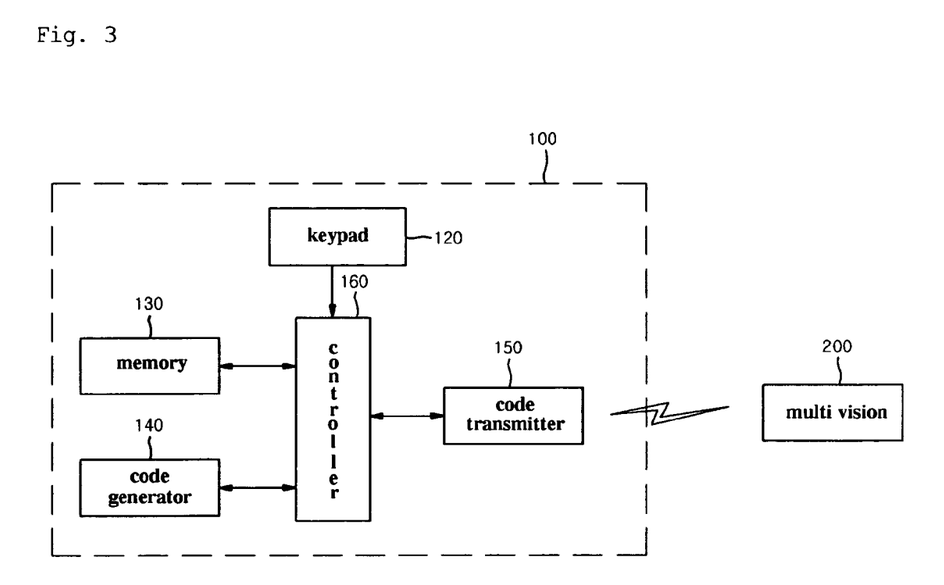
FIG. 3 presents a block diagram of a remote controller having a function for setting an access code in accordance with an embodiment of the present invention.

The remote controller 100 includes a keypad 120, a memory 130, a code generator 140, a code transmitter 150 and a controller 160.

The keypad 120 has a multiplicity of menu keys for selecting and executing corresponding menu items and numerical keys for inputting an access code assigned to each video display device. Accordingly, the user can input an access code assigned to one among the plurality of video display devices 200a to 200i by using the numerical keys of the keypad 120.

The memory 130 stores access codes assigned to the plurality of video display devices 200a to 200i and a custom code representing an apparatus capable of receiving control data. Though default values of the access codes are stored in the memory 130 at the beginning, they can be modified into new access codes in response to a request of the user and the new access codes may be stored in the memory 130. Since the access codes have been stored in advance, they can be inputted easily. If separate keys for the access codes are provided, the user can input the access codes automatically by using the separate keys.

The code generator 140 generates the first to the third control data according to a manipulation of the keypad 120 and a control of the controller 160. Then, the code transmitter 150 transmits the first to the third control data to the plurality of video display devices 200a to 200i by using a communication technique such as an infrared communication or a bluetooth communication according to an instruction of the controller 160.

The controller 160 generates the first control data for setting or canceling the OSD locking function and transmits the first control data to the plurality of video display devices 200a to 200i when a signal for setting or canceling the OSD locking function is inputted thereto by using the lock key 110.

Moreover, the controller 160 generates the second control data including an access code and transmits them to the plurality of video display devices 200a to 200i when the user presses the access code assigned to a video display device among the plurality of video display devices 200a to 200i by using the keypad 120 or presses a predetermined key for inputting the access code of the video display device.

Then, if the user inputs a command to adjust a screen of the video display device among the plurality of video display devices 200a to 200i by using the keypad 120, the controller 160 generates the third control data including the command and transmits them to the plurality of video display devices 200a to 200i.

The plurality of video display devices 200a to 200i constituting the multivision can display various images received from the operator server 300 or the external device 400 through the communication port on a screen and perform functions according to the first to the third control data inputted by the remote controller 100.

Figure 4:
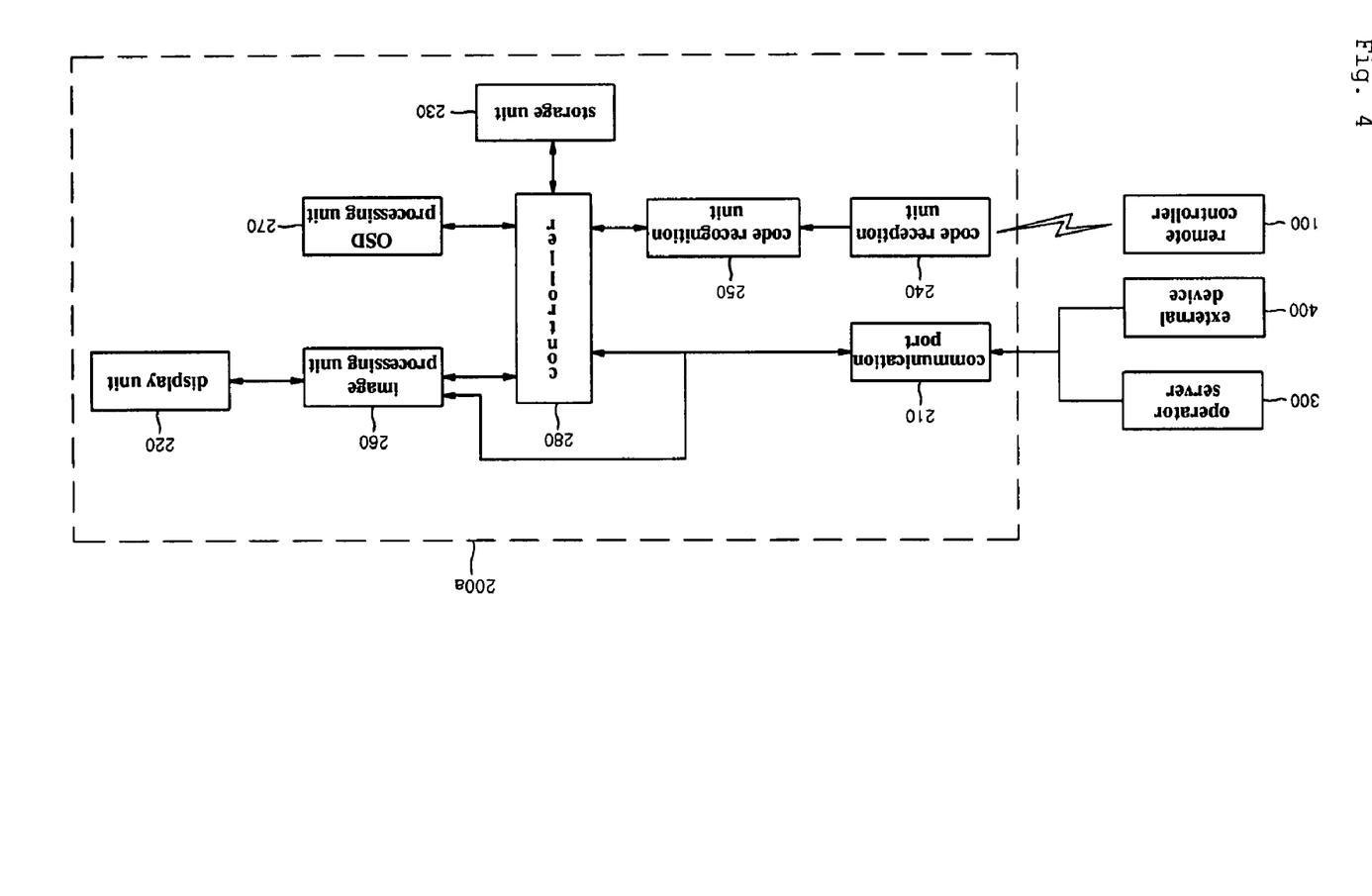
FIG. 4 sets forth a block diagram of a video display device for controlling an OSD environment in connection with an access code in accordance with an embodiment of the present invention.

Since a configuration and an operation of each of the plurality of video display devices 200a to 200i are the same, the configuration and the operation of a video display device will be described with reference to FIG. 4 hereinafter.

One among the plurality of video display devices 200a to 200i includes a communication port 210, a display unit 220, a storage unit 230, a code reception unit 240, a code recognition unit 250, an image processing unit 260, an OSD processing unit 270 and a control unit 280.

The communication port 210 communicates with the operator server 300 through a RS-232C cable; receives an access code from the operator server 300; and transmits the access code to the control unit 280. Further, the communication port 210 also communicates with the external device 400, e.g., a set-top box, a DVD player, a VCR and the like, through the RS-232C cable; receives image signals from the external device 400; and provides the image signals to the image processing unit 260.

The image processing unit 260 outputs original image signals received from the external device 400 to the display unit 220 according to a control of the control unit 280; or divides and magnifies original image signals and then outputs the divided and magnified image signals to the display unit 220 according to a control of the control unit 280. Further, the image processing unit 260 outputs various types of OSD data provided by the OSD processing unit 270 to the display unit 220 under control of the control unit 280. The OSD data may display various images including an access code assigned to a corresponding video display device in accordance with the preferred embodiment of the present invention, and an OSD menu for adjusting a screen and the like.

The storage unit 230 is a storage medium for storing various kinds of information including a processing program of the control unit 280 and can be implemented by using a memory element such as a RAM and EEPROM or a Hard Disk Driver. Particularly, the storage unit 230 stores therein an access code assigned to a corresponding video display device in accordance with the preferred embodiment of the present invention.

The code reception unit 240 receives the first to the third control data transmitted from the remote controller 100 by using a technique such as an infrared or a bluetooth communication, and then sends them to the code recognition unit 250. The code recognition unit 250 receives and restores the first to the third control data transmitted from the remote controller 100; extracts an access code from the second control data in accordance with the preferred embodiment of the present invention; compares the extracted access code with the access code stored in the storage unit 230; checks whether the two access codes are the same; and provides the result to the control unit 280.

The OSD processing unit 270 generates OSD data under control of the control unit 280 and provides them to the image processing unit 260. The OSD data includes an access code assigned to a corresponding video display device in accordance with the preferred embodiment of the present invention, an OSD menu for adjusting a screen and the like.

The control unit 280 sets or cancels the OSD locking function; enters into an access mode after recognizing the access code; and receives various command such as a screen adjustment command and then takes a proper action based on the first to the third control data.

Hereinafter, a detailed operation of the control unit 280 will be explained.

The control unit 280 cancels the OSD locking function when the first control data for canceling the OSD locking function is inputted by the remote controller 100.

Figure 5:
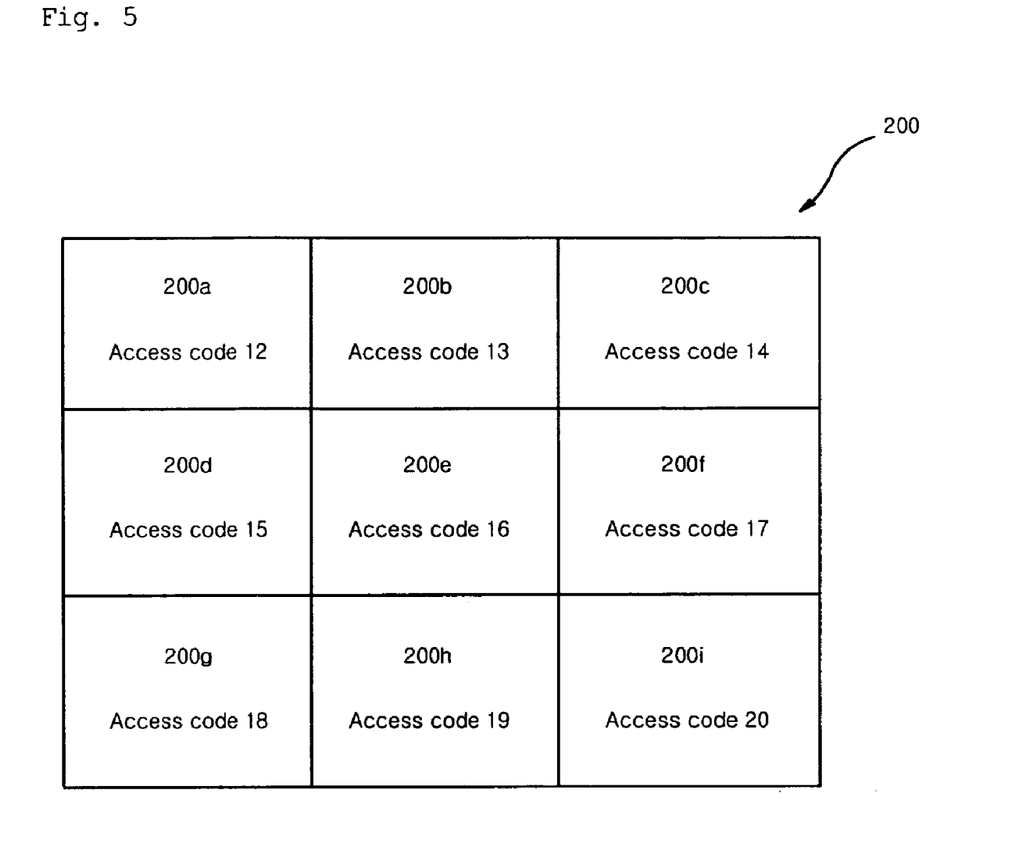
FIG. 5 shows a screen having a plurality of frames to which access codes are assigned in accordance with an embodiment of the present invention.

If the OSD locking function is cancelled like this, the control unit 280, as shown in FIG. 5, reads an access code stored in the storage unit 230 and controls the OSD processing unit 270 to generate OSD data for displaying the access code on the display unit 220. The OSD processing unit 270 generates the OSD data under control of the control unit 280 and provides the image processing unit 260 with the OSD data. Then, the image processing unit 260 displays the OSD data on the display unit 220.

At this time, if the second control data including the access code assigned to a video display device is inputted by the remote controller 100, the control unit 280 checks whether the access code contained in the second control data is equal to the access code stored in the storage unit 230 or not by using the code recognition unit 250. If the two access codes are the same, the control unit 280 enters an OSD control mode using an OSD menu.

Figure 6A:
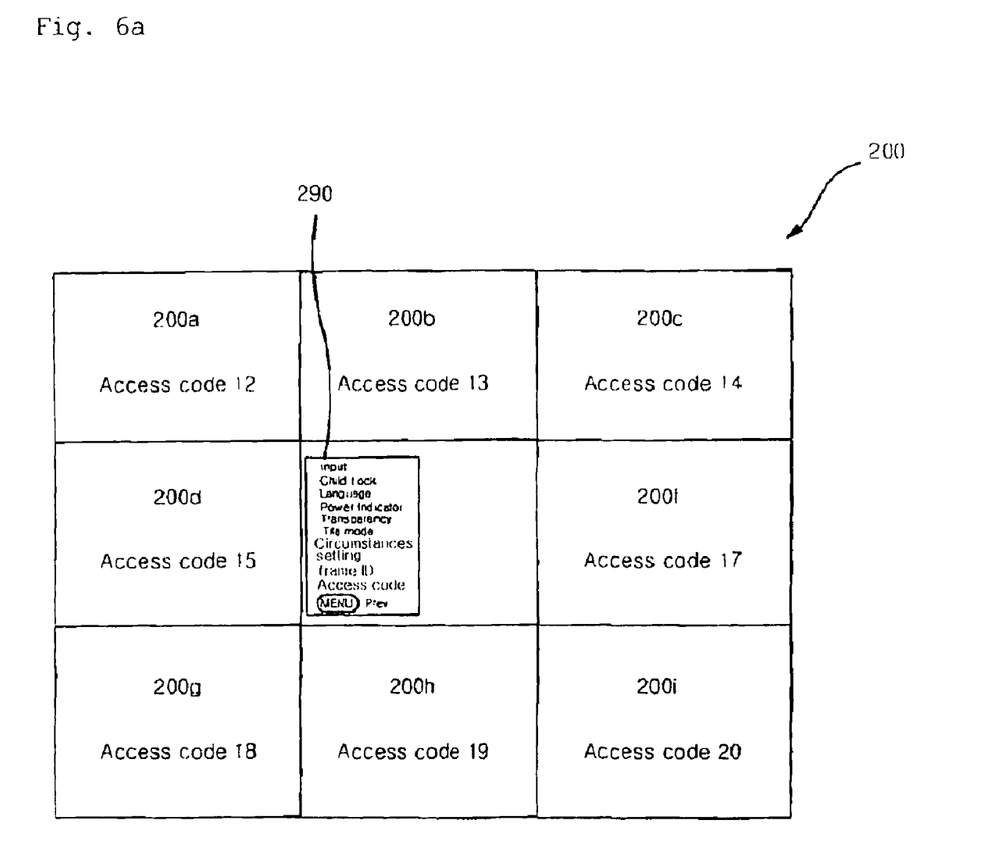
FIGS. 6a to 6c illustrate screens of a multivision on which an OSD menu image is displayed in accordance with an embodiment of the present invention.

If a selection signal of the OSD menu is inputted by the remote controller 100 during the OSD control mode, the control unit 280 displays an OSD menu image 290 on a specific frame where the OSD control mode is running as shown in FIG. 6a. The user can control the corresponding video display device by using the OSD menu image 290.

Figure 6B:
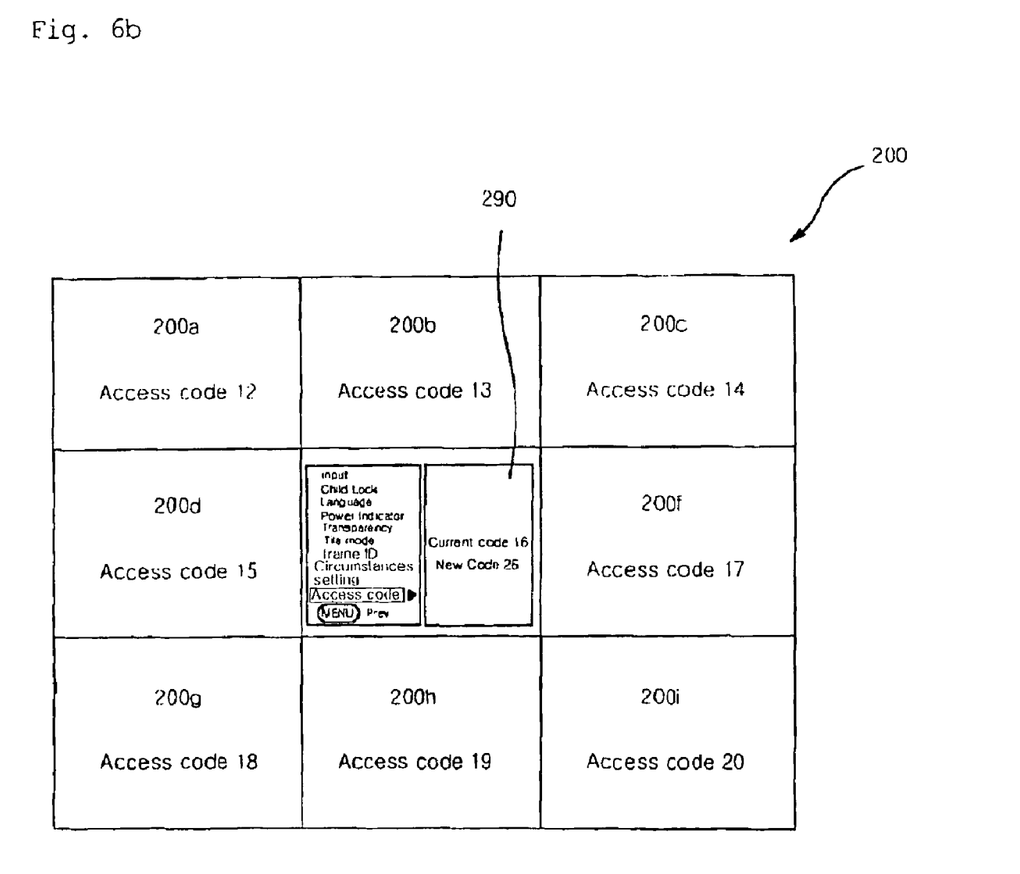

If the user selects an access code menu contained in the OSD menu image 290 by using the remote controller 100 in order to change the access code of the corresponding video display device, the control unit 280 displays the OSD menu image for receiving a new access code of the corresponding video display device as shown in FIG. 6b.

Then, if the new access code is inputted by the remote controller 100, the control unit 280 changes the access code of the corresponding video display device into the new access code and stores the new access code in the storage unit 230. At this time, the access code stored in the remote controller 100 can also be modified into the new access code at the same time. For this purpose, the controller 160 of the remote controller 100 checks whether the user requests a change of the access code of the corresponding video display device using the OSD menu, and if so, changes the access code thereof.

Figure 6C:
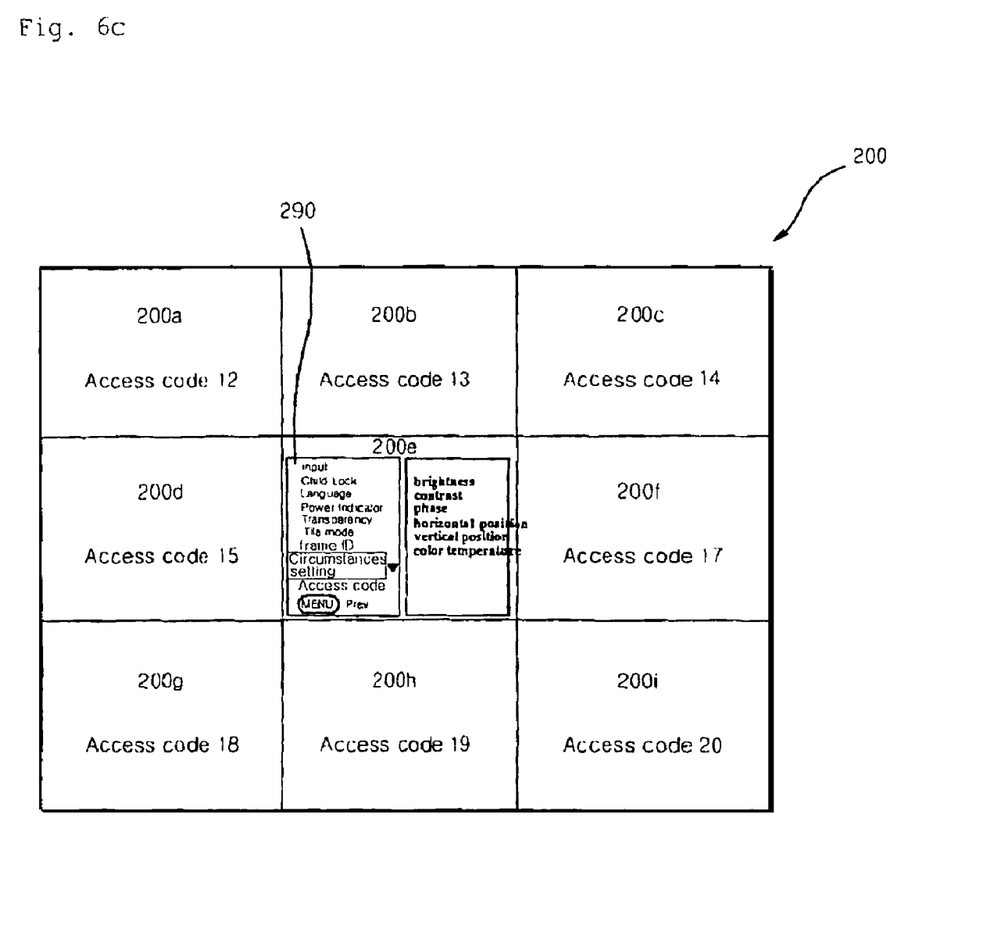

Further, if the user selects an environment configuration menu contained in the OSD menu image 290 in order to adjust the screen state of the corresponding video display device, the control unit 280 controls the OSD processing unit 270 to display an OSD menu image 290 showing OSD menus such as a brightness adjustment, a contrast adjustment, a phase adjustment, a horizontal position adjustment, a vertical position adjustment, a color temperature adjustment and the like as shown in FIG. 6c.

If the third control data concerning the corresponding video display device are inputted through the use of the above-mentioned OSD menu image 290, the control unit 280 takes an action based on the third control data.

In the following, there will be described a method for storing the access codes set in the plurality of video display devices 200a to 200i in the remote controller 100 with reference to the accompanying drawings.

Figure 7:
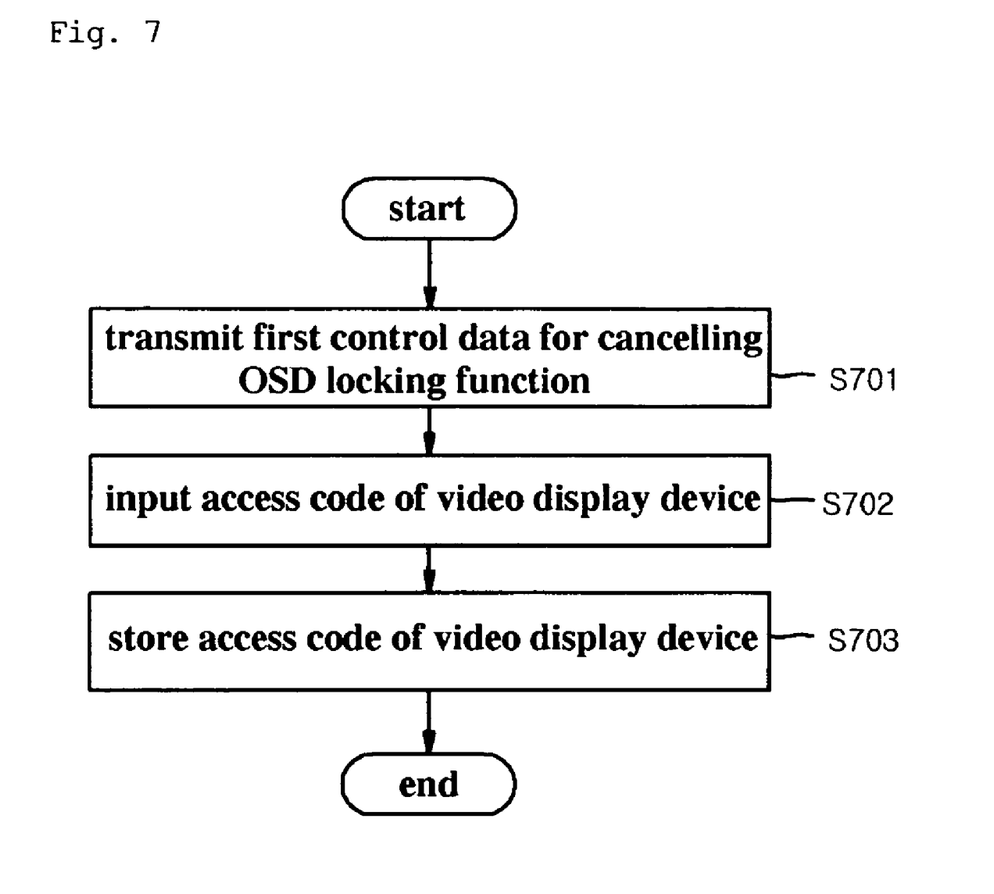
FIG. 7 is a flow chart showing a method for storing an access code assigned to a specific frame of a screen of a multivision by a remote controller in accordance with an embodiment of the present invention.

A method for storing the access codes assigned to the plurality of video display devices 200a to 200i in the remote controller 100 in accordance with an embodiment of the present invention will be described with reference to FIG. 7.

If the lock key for canceling the OSD locking function is pressed, the controller 160 of the remote controller 100 generates the first control data for canceling the OSD locking function and sends them to the plurality of video display devices 200a to 200i, thereby canceling the OSD locking function of the plurality of video display devices 200a to 200i (step 701).

Then, each of the plurality of video display devices 200a to 200i displays an access code assigned to oneself as shown in FIG. 5 upon receiving the first control data for canceling the OSD locking function.

If the user inputs the access code corresponding to a video display device based on the displayed access code (step 702), the controller 160 of the remote controller 100 stores the inputted access code in the memory 130 in correspondence with the video display device (step 703).

At this time, if the user inputs a new access code of a video display device through the keypad 120, the controller 160 of the remote controller 100 can change the access code of the video display device into the new access code and store the new access code in the memory 130.

Figure 8:
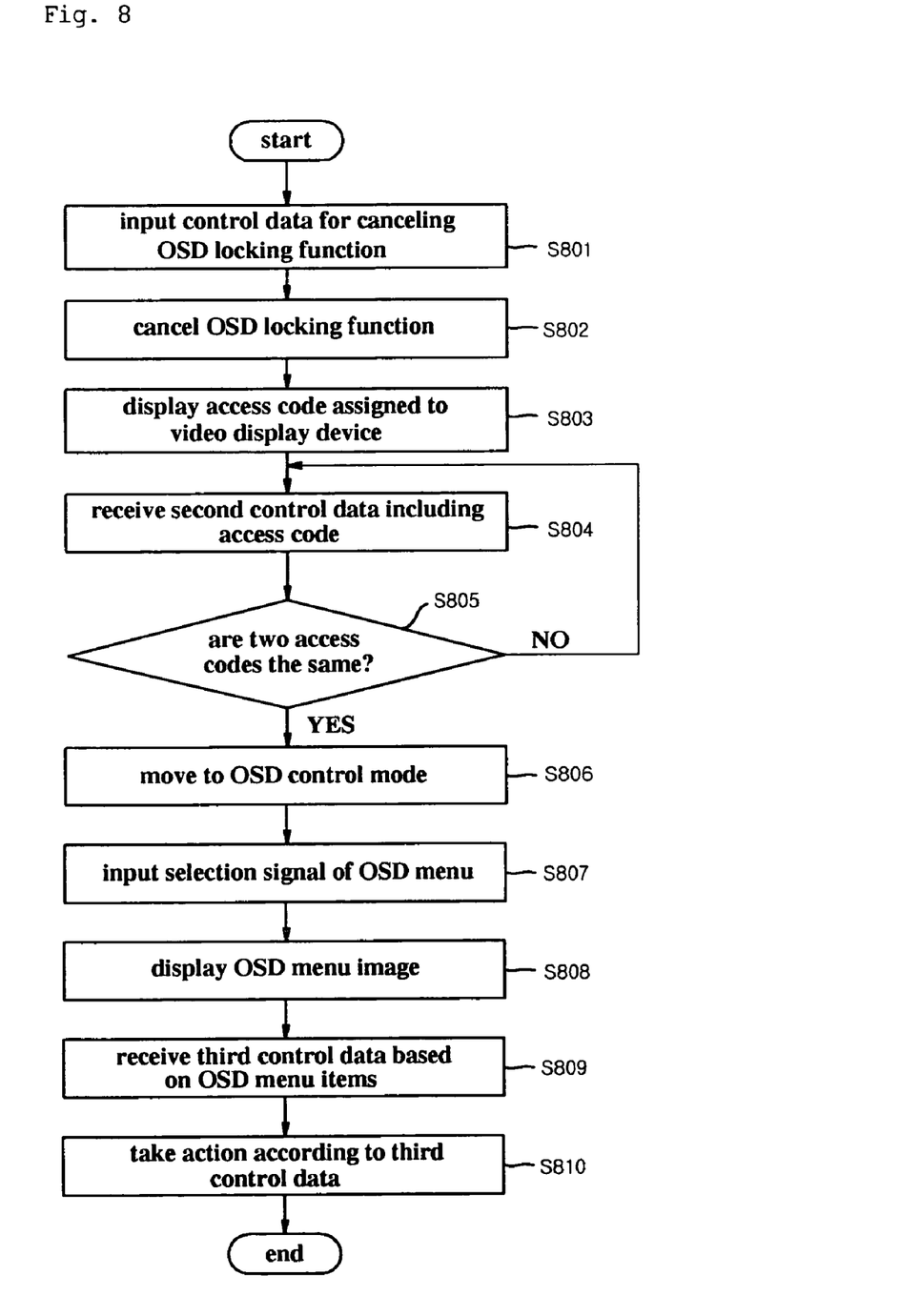
FIG. 8 provides a flow chart showing a method for controlling an OSD environment set in a specific frame of a screen of a multivision in accordance with an embodiment of the present invention.

In the following, there will be described a method for controlling a video display device among the plurality of video display devices 200a to 200i constructing the multivision in connection with an access code according to an embodiment of the present invention with reference to FIG. 8.

If the plurality of video display devices 200a to 200i implementing the multivision receive the first control data for canceling the OSD locking function from the remote controller 100 (step 801), each control unit of the plurality of video display devices 200a to 200i cancels the OSD locking function according to the first control data (step 802).

Thereafter, the control unit of each of the plurality of video display devices 200a to 200i displays the access code assigned to oneself and stored in the storage unit through the display unit (step 803). Herein, the access codes assigned to the plurality of video display devices 200a to 200i constituting the multivision may be default values or values set in response to a user's request.

Then, if the user inputs the second control data including the access code of a video display device among the plurality of video display devices 200a to 200i by using the remote controller 100 (step 804), the control unit of each of the plurality of video display devices 200a to 200i checks whether the access code contained in the second control data is equal to the access code stored in one's storage unit through the use of the code recognition unit (step 805).

As a result, if the video display device has the stored access code same as the received access code, the control unit of the video display device moves to the OSD control mode using the OSD menu (step 806).

However, the other video display devices having the stored access code not equal to the received access code keep displaying the stored access code.

During the OSD control mode, the user can control only one video display device to adjust a screen state by using the remote controller 100 while the user cannot control the other video display devices.

If a selection signal regarding the OSD menu is inputted by the remote controller 100 (step 807), the control unit of the video display device during the OSD control mode displays the OSD menu image 290 including various kinds of OSD menus through the display unit as shown in FIGS. 6a to 6c (step 808).

If the user inputs a selection signal for choosing an OSD menu item contained in the OSD menu image 290 by using the remote controller 100 (step 809), the control unit of the corresponding video display device takes an action according to the selection signal (step 810).

In other words, the user can individually control one of the plurality of video display devices 200a to 200i by using the OSD menu. That is, the user can perform a brightness adjustment, a contrast adjustment, a phase adjustment, a horizontal position adjustment, a vertical position adjustment, a color temperature adjustment and the like concerning one video display device through the use of the OSD menu.

Further, the user can also set a new access code regarding a video display device through the OSD menu.

As mentioned above, the present invention may selectively control one or more display devices among a plurality of video display devices constituting the multivision by using a remote controller.

Accordingly, a user can adjust each video display device forming the multivision located adjacently while watching a screen state thereof directly.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A multivision system, comprising:
a plurality of video display devices; and a remote controller configured to transmit plural types of control data to the plurality of video display devices,
wherein each of the plurality of video display devices includes
a storage unit configured to store a video display device specific access code;
a reception unit configured to receive the plural types of control data from the remote controller;
a display unit configured to display data;
a code recognition unit configured to compare received access codes to the access code stored in the storage unit; and
a control unit operatively connected to the code recognition unit and the display unit, the control unit configured to cause the corresponding display unit to display the access code stored in the storage unit when the one of plural types of control data includes control data for canceling an on screen display (OSD) locking function such that each of the plurality of video display devices simultaneously display a corresponding stored access code, and to control the video display device to enter a control mode using an OSD menu if the code recognition unit determines that a subsequently received control data includes an access code that is the same as the access code stored in the storage unit.

2. The multivision system of claim 1, each of the plurality of video devices further comprising:
an OSD processing unit operatively connected to the control unit and configured to generate OSD data for displaying the stored access code when the subsequently received control data includes the access code that is the same as the access code stored in the storage unit; and
an image processing unit operatively connected to the OSD processing unit and configured to receive image signals from another device or receive the OSD data from the OSD processing unit, and output processed image signals or output the stored access code to the display unit, respectively.

3. The multivision system of claim 1, wherein the control unit is configured to cancel the OSD locking function when control data for canceling the OSD locking function is received through the reception unit and, after the OSD locking function is cancelled, take an action according to subsequent control data.

4. The multivision system of claim 1, wherein the control unit is configured to receive a new access code during the control mode via the OSD menu and then change the stored access code into the new access code.

5. The multivision system of claim 2, wherein the image processing unit is configured to change a size of the image signals into a full screen size or a predetermined size according to a control of the control unit.

6. The multivision system according to one of claims 1 to 5, wherein a screen state of the video display device is adjusted during the control mode using the OSD menu.

7. The multivision system according to claim 1, wherein the control unit is configured to control the corresponding video display device to not enter the control mode if the subsequently received control data does not include an access code that is the same as the stored access code.

8. The multivision system of claim 1, the remote controller further comprising:
a keypad where a multiplicity of keys are arranged;
a memory configured to store access codes of the plurality of video display devices;
a code generator configured to generate the plural types of control data through the keypad;
a code transmitter configured to transmit the plural types of control data to the plurality of video display devices; and
receiving, by the plurality of video display devices and from the remote controller, one of plural types of control data; and
performing the following steps in each of the plurality of video display devices:
displaying a stored video display device specific access code when the one of plural types of control data includes control data for canceling an on screen display (OSD) locking function such that each of the plurality of video display devices simultaneously display a corresponding stored video display device specific access code; and
entering a control mode using an OSD menu if a subsequently received control data includes an access code that is the same as the stored access code.

9. The multivision system of claim 8, wherein the keypad includes an OSD lock key configured to cancel or set the OSD locking function.

10. The multivision system of claim 8, wherein the controller is configured to change the access code stored in the memory into a new access code when the new access code is inputted by the keypad.

11. The multivision system of claim 8, wherein the controller is configured to change the access code stored in the storage unit into a new access code during the control mode using the OSD menu while changing the access code stored in the memory into the new access code at the same time.

12. The multivision system of claim 8, wherein the code transmitter comprises an infrared transmitter or a bluetooth transmitter.

13. A method for controlling a multivision system including a remote controller and a plurality of video display devices, comprising the steps of:
displaying data on the plurality of video display devices;
include an access code that is the same as the stored access code.

14. The method of claim 13, the step of performing further comprising the step of:
changing the stored access code to a new access code during the control mode using the OSD menu.

15. The method of claim 13, the step of performing further comprising:
adjusting a screen state during the control mode using the OSD menu.

16. The method of claim 13, the step of performing further comprising:
not entering the control mode if the subsequently received control data does not
a controller operatively connected to the keypad and configured to control the code generator and the code transmitter based on a signal from the keypad.

17. The method of claim 13, the step of performing further comprising:
changing the stored access code to a new access code during the control mode using the OSD menu and while changing an access code of the remote controller.

* * * * *